United States Patent [19]

Leitzke

[11] Patent Number: 4,718,743
[45] Date of Patent: Jan. 12, 1988

[54] REFLECTOR FOR SPOKED WHEEL

[76] Inventor: Michael D. Leitzke, 8633 W. Ruby Ave., Milwaukee, Wis. 53225

[21] Appl. No.: 900,724

[22] Filed: Aug. 27, 1986

[51] Int. Cl.[4] ............................................. G02B 5/12
[52] U.S. Cl. ......................................... 350/99; 350/97
[58] Field of Search ........................... 350/97, 99, 103

[56] References Cited

U.S. PATENT DOCUMENTS

| 2,344,542 | 3/1944 | Fike | 350/99 |
| 2,621,081 | 12/1952 | Mann | 350/99 |
| 3,684,347 | 8/1972 | Challe et al. | 350/99 |
| 3,781,082 | 12/1973 | Linder | 350/97 |
| 3,924,928 | 12/1975 | Trimble | 350/97 |
| 3,995,938 | 12/1976 | Olson | 350/99 |
| 4,037,924 | 7/1977 | May | 350/97 |

FOREIGN PATENT DOCUMENTS 766704  1/1957  United Kingdom ................. 350/99

Primary Examiner—Bruce Y. Arnold
Assistant Examiner—Vincent J. Lemmo
Attorney, Agent, or Firm—Andrus, Sceales, Starke & Sawall

[57] ABSTRACT

The reflector is mounted on a single spoke of a spoked wheel and comprises plate member having a body portion disposed between opposed end portions. A spoke is received in appropriate recesses in the body portion adjacent to the end portions with the body portion disposed on one side of the spoke and the end portions on the opposite side of the spoke. Tab means on the respective end portions of the member serve to generally preclude a dislodgement of the reflectors during operation of the spoked wheel.

9 Claims, 9 Drawing Figures

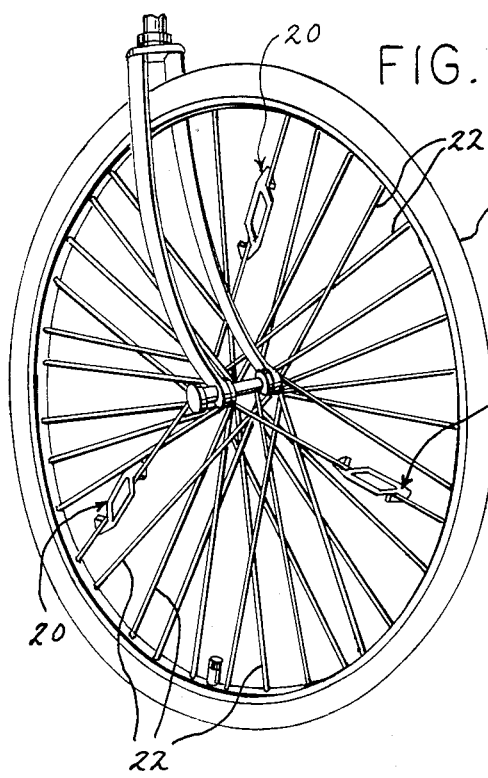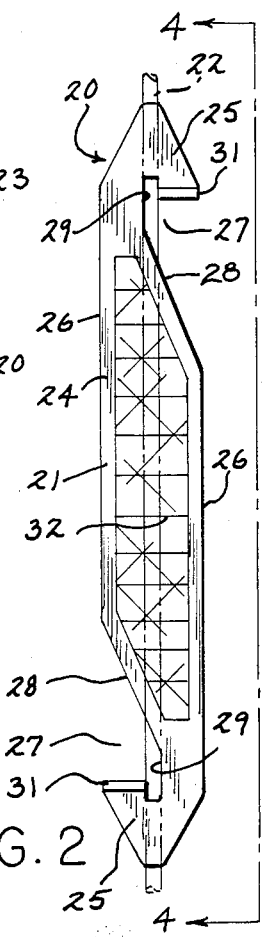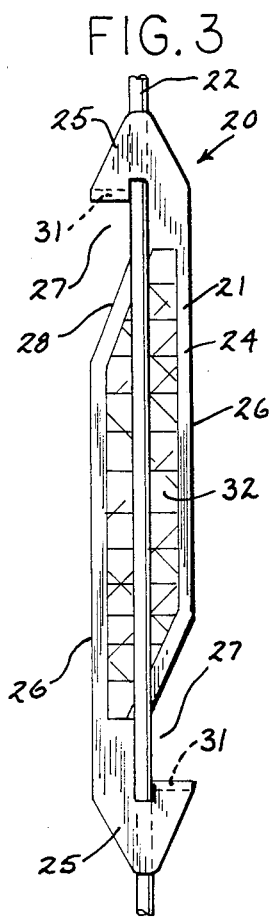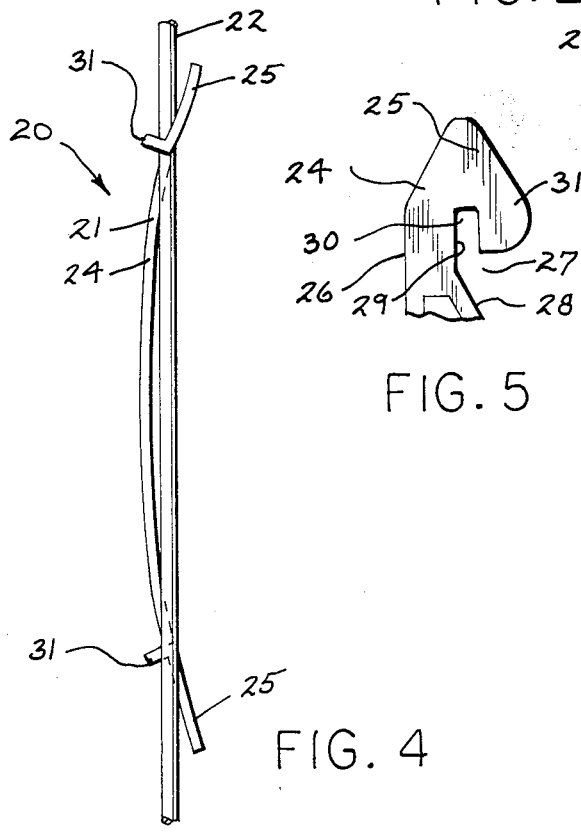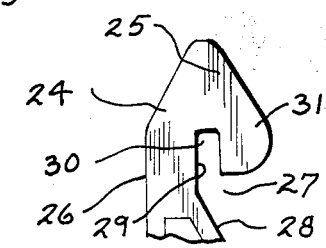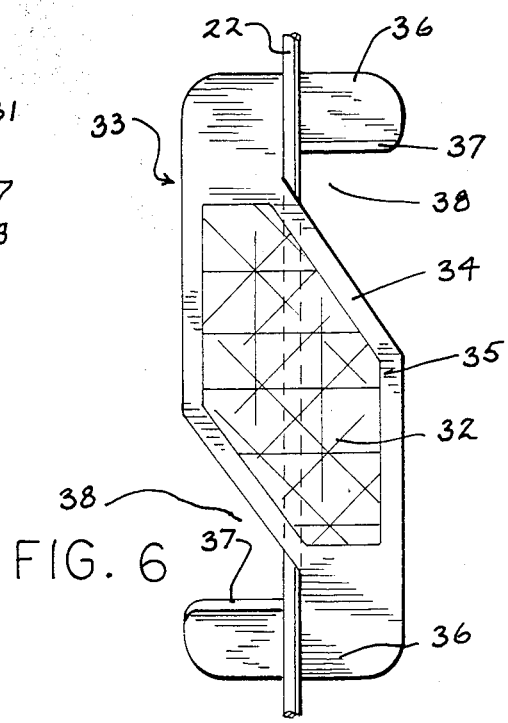

REFLECTOR FOR SPOKED WHEEL

BACKGROUND OF THE INVENTION

This invention relates to a reflector for use on spoked wheels such as the wheels of bicycles.

For both safety and attractiveness, light relfective devices have been devised for use on the spoked wheels of bicycles, and other spoked wheel vehicles. Often the reflective devices are assemblies of a base element with opposed reflective glass elements. The devices often span an angular distance of two (2) or more spokes. Over a period of time, the elements of the device assemblies loosen and become a source of noise. Also, the device assemblies are relatively heavy, sometimes even to the point of disturbing the balance of a wheel. It is generally an object of this invention to provide a reflector which is of light weight, attractive and mountable on a single spoke of a wheel.

SUMMARY OF THE INVENTION

The invention is directed to a reflector for mounting on a given spoke of a spoked vehicle wheel and comprises a plate member having a body portion disposed between opposed end portions. The body portion of the plate member is provided with a recess adjacent to the respective end portions and which opens to the side of the member. The recesses extend transversely inwardly beyond the longitudinal centerline of the body portion. The recesses are adapted to receive a spoke of the wheel which is to extend generally along the longitudinal centerline of the body portion with the body portion disposed on one side of the spoke and the respective end portions on the opposite side of the spoke. Tab means are provided on the respective end portions of the member to generally preclude a dislodgement of the reflector during operation of the wheel.

DESCRIPTION OF THE DRAWING FIGURES

The drawings furnished herewith illustrate the best mode presently contemplated for the invention and are described hereinafter.

In the drawings:

FIG. 1 shows the spoked wheel of a bicycle with several of the light reflecting devices of this invention in place;

FIG. 2 is a front elevational view of a light reflecting device according to this invention as installed on the spoke of a wheel;

FIG. 3 is a rear elevational view of the light reflecting device;

FIG. 4 is an edge elevational view as generally taken on line 4—4 of FIG. 2;

FIG. 5 is a detail view showing an end portion of a light reflecting device;

FIG. 6 is a view generally similar to that of FIG. 2 and shows a light reflecting device of a different configuration;

DESCRIPTION OF THE ILLUSTRATED EMBODIMENTS

Figure 7:
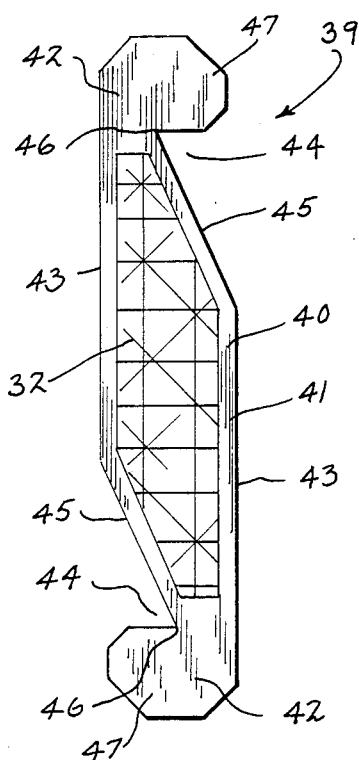
FIG. 7 is an elevational view of still another light reflecting device.

Referring to the drawings, the reflector 20 generally comprises a plate member 21 for mounting disposition on a single given spoke 22 of a wheel 23 for a bicycle or other spoked-wheel vehicle.

Fabricated from a molded plastic or metal, the plate member 21 extends longitudinally of the spoke 22 and includes an intermediate body portion 24 disposed between opposed end portions 25. The body portion 24 may have generally straight, opposed side edges 26 that generally parallel the spoke 22 and therefore each other.

Adjacent to the respective end portions 25, the body portion 24 of the reflector 20 is provided with a side opening recess 27, with the respective recesses opening in opposite directions. Each recess 27 is in part formed by the edge 28 that extends angularly inward from the side edge 26 forming an obtuse angle therewith. The edge 28 extends inwardly somewhat past the longitudinal centerline of the plate member 21 and terminates at the edge 29 which generally parallels the side edges 26.

The edge 29 forms one side of the recess 30 that extends into the end portion 25 and opens into the recess 27 and in the direction of the body portion 24. The recess 30 at each end of the plate member 21 extends generally along the longitudinal centerline thereof and they are therefore longitudinally aligned relative to each other and generally parallel to the side edges 26. The width of recesses 30 corresponds generally to the diameter of the wheel spoke 22 to be received therein in a manner to be described hereinafter.

On the opposite side of recess 30 from the edge 29 the end portions 25 are each provided with a tab 31 adjacent to the recess 27. When the reflector 20 is fabricated of a molded plastic, the tabs 31 project vertically or normal in a common direction relative to the plate member 21 as perhaps best shown in FIG. 4. When the reflector is fabricated from metal, the tabs 31 will initially project into the recess 27 in the plane of the plate member 21 as generally shown in FIG. 5, and thereafter may be bent to extend generally normal to the plate member in the manner of FIG. 4.

If the material of the plate members 21 are not adequately light reflective, adhesive backed light reflective tape 32 may be secured to the opposed surfaces of the members.

To mount a reflector 20 on a spoke 22 of a wheel 23, the plate member 21 is manually flexed or bent generally about its transverse centerline with the selected spoke being received within the opposed recesses 27. If the tabs 31 remain in the plane of the plate member 21, the flexed plate member 21 is maneuvered to engage the spoke 22 against the respective edges 29 so that the spoke can enter the opposed spoke retaining recesses 30 when flexure of the plate member 21 is relaxed. The tabs 31 in the plane of the plate member 21, can thereafter be bent to a condition generally normal to the plate member and across the spoke 22, as generally shown in FIG. 4 to better retain the reflector 20 on the spoke. If the tabs 31 already extend normal relative to the plate member 21, as would be the case with a molded plastic plate member, a somewhat greater flexing force about the generally transverse centerline will be needed to pass the spoke 22 over the vertically projecting tabs for entry into the opposed recesses 30. As generally shown in FIG. 4, the elasticity of the plate member 21 serves to provide for a spring-like bias relative to the spoke 22 to preclude a dislodgement of the member on and relative to the spoke.

In view of the generally light weight of the reflectors 20, any desired number, within limits, can be mounted on a given wheel 23. And if the reflectors 20 are equiangularly spaced, even the balance of the wheel 23 should remain virtually unaffected. As shown in FIG. 1, three (3) reflectors 20 are shown mounted on the wheel 23 spaced equiangularly at 120 degree intervals.

In the embodiment of FIG. 6, the reflector 33 comprises a plate member 34 having a body portion 35 somewhat wider than that for reflector 20. The opposed end portions 36 of the plate member 34 are generally rectangular as opposed to the generally triangular end portions 25 of the reflectors 20. Similar to reflector 20, the plate member 34 of reflector 33 is flexed for mounting on a spoke 22 and relies on a spring-like bias of the material for retention on the spoke. The tabs 37 on the respective end portions 36 adjacent to the corresponding recesses 38 project generally normal to the plate member 34 and serve to better retain the reflector 33 on the spoke 22.

Figure 8:
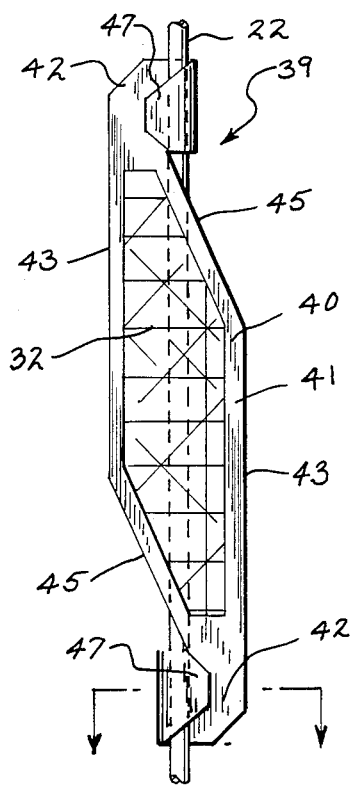
FIG. 8 is an elevational view showing the light reflecting device of FIG. 7 mounted on the spoke of a wheel.
Figure 9:
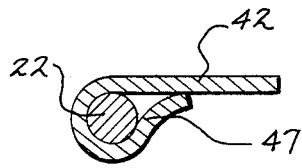
FIG. 9 is a sectional view taken generally on the line 9—9 of FIG. 8.

Turning now to the embodiment of FIGS. 7-9, the reflector 39 comprises a plate member 40 of relatively thin metal, perhaps on the order of 0.008 inches thick and preferably of light weight aluminum. The plate member 40 includes an intermediate body portion 41 disposed between the opposed end portions 42. The body portion 41 may have generally parallel side edges 43 which are interrupted by the side opening, generally triangular recesses 44 adjacent to the respective end portions 42. Each recess 44 is formed in part by the edge 45 which extends angularly inward from the corresponding side edge 43 to the angular junction 46 somewhat beyond the longitudinal centerline of the plate member 40 and adjacent to the corresponding end portion 42. Each end portion 42 includes a tab 47 that extends transversely generally normal to the longitudinal centerline as perhaps best shown in FIG. 7. Appropriately cut reflective tape 32 may adorn both sides of the plate member 40.

To mount the reflector 39 on a spoke 22, the plate member 40 is manipulated such that the recesses 44 receive the spoke with the end portions 42 disposed on the opposite side of the spoke from the body portion 41. The spoke 22 is received generally adjacent to the angular junction 46 to place the spoke generally along the longitudinal centerline of the reflector 39 as generally shown in FIG. 8. With the reflector 39 in position relative to the spoke 22, the respective tabs 47 are bent transversely over the spoke as generally shown in FIGS. 8 and 9 to frictionally secure the reflector on the spoke.

The invention thus provides a spoke mounted light reflecting device which is light weight and attractive. In view of their relatively modest cost and the ease with which they can be mounted onto a spoke, the reflectors of this invention could prove to be a boon to safer bicycle riding.

Various modes of carrying out the invention are contemplated as being within the scope of the following claims particularly pointing out and distinctly claiming the subject matter which is regarded as the invention.

I claim:

1. A reflector for mounting on a spoke of a vehicle wheel, comprising a plate member having a longitudinally extending body portion disposed between opposed end portions, said body portion having a recess adjacent to the respective end portions and opening to the side of the member, said recesses extending transversely inwardly beyond the longitudinal centerline of the body portion and being adapted to receive a spoke to extend generally along the longitudinal centerline of the body portion with the body portion disposed on one side of the spoke and the respective end portions on the opposite side of the spoke, and tab means on the respective end portions of the member to generally preclude a dislodgement of the reflector during operation of the wheel.

2. The structure set forth in claim 1 wherein the respective recesses open to opposite sides of the member.

3. The structure set forth in claim 1 or 2 wherein a second recess is disposed generally on the longitudinal centerline of the member and opens into the corresponding first recess, said second recesses serving to receive and retain the spoke and help to preclude dislodgement of the reflector during operation of the wheel.

4. The structure set forth in claim 1 wherein the plate member has a degree of elasticity and is bendable about its generally transverse centerline for mounting on a spoke, the elasticity of said plate member helping to preclude dislodgement of the reflector during operation of the wheel.

5. The structure set forth in claim 1 wherein the light reflective medium is an adhesive-backed reflective tape secured on the opposed sides of the plate member.

6. The structure set forth in claim 1 wherein the tab means is a tab member that projects longitudinally from the respective end portions into the corresponding recesses, said tab members being bendable to a position generally normal to the plate member and radially relatively to the spoke.

7. The structure set forth in claim 1 wherein the plate member is a molded plastic member and the tab means comprise a tab member that extends generally normal to the respective end portions adjacent to the corresponding recesses and in spaced relation from the longitudinal centerline.

8. The structure set forth in claim 1 wherein the tab means on the respective end portions comprise tab members extending generally transversely relative to the longitudinal centerline, said tab members being transversely bendable over a spoke to frictionally secure the reflector to the spoke.

9. The structure set forth in claim 8 wherein the respective recesses open to opposite sides of the plate member and the adjacent tab members similarly extend to opposite sides of the plate member.

* * * * *